United States Patent Office 3,017,822
Patented Jan. 23, 1962

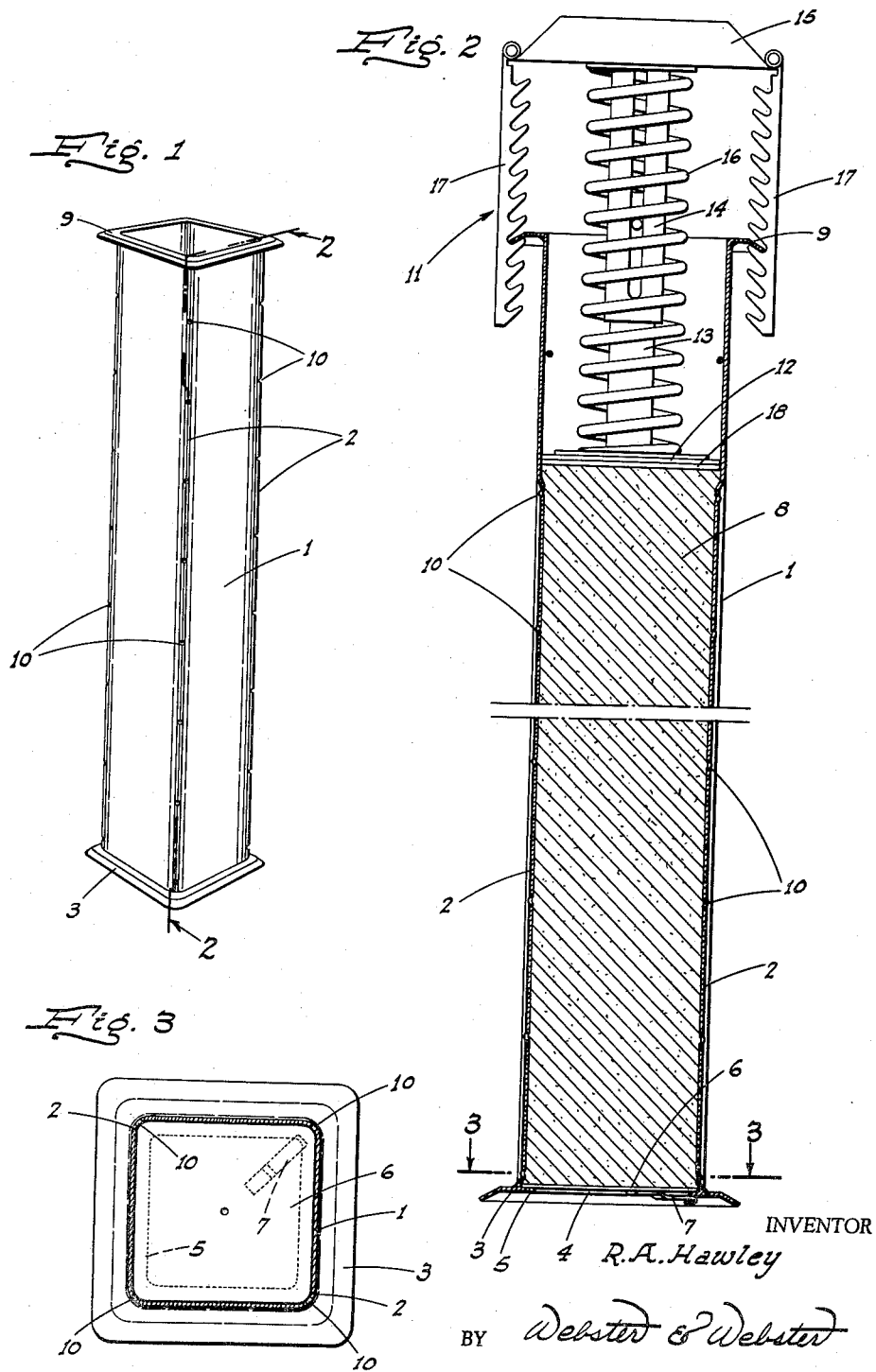

3,017,822
MOLD FOR FOOD PRODUCTS
Richard A. Hawley, Oakland, Calif., assignor to Meat Packers Equipment Co., Oakland, Calif., a corporation of California
Filed Feb. 8, 1960, Ser. No. 7,171
2 Claims. (Cl. 100—240)

This invention relates to the food processing industry, and particularly to a mold in which a food product, such as ham and other meats, is compressed and molded into loaf form. Apparatus for doing this is shown for instance in my United States Patent No. 2,726,024, dated December 6, 1955.

In thus forming a meat loaf in the conventional solid-walled mold of substantially square form, it was noted that the loaf, when removed from the mold, usually had rough or ragged and pocked corner edges. This was found to be due to the fact that as the meat was pressed, excess fat, air, and the like in the meat—and tending to be squeezed therefrom by the pressing action—collected and remained in the corners of the mold. When the loaf is subsequently sliced, the individual slices have ragged edges and present an unattractive appearance.

It is therefore the major object of this invention to eliminate this objectionable feature by venting the mold in a suitable manner as will be hereinafter seen.

The mold assembly includes a closure unit for the mold including a spring-pressed closure plate to engage the meat at the feed-in end of the mold after the loaf has been formed and initially pressed, and another object of this invention is to provide an improved unit for the purpose over what has been previously employed.

Another object of the invention is to provide a mold for food products which is designed for ease and economy of manufacture.

An additional object of the invention is to provide a practical, reliable, and durable mold for food products, and one which will be exceedingly effective for the purpose for which it is designed.

These objects are accomplished by means of such structure and relative arrangement of parts as will fully appear by a perusal of the following specification and claims.

In the drawings:
FIG. 1 is a perspective view of the mold body.
FIG. 2 is an enlarged foreshortened elevation of the complete mold structure; the mold body being in section substantially on line 2—2 of FIG. 1.
FIG. 3 is a cross section on line 3—3 of FIG. 2.

Referring now more particularly to the drawings and to the characters of reference marked thereon, the mold body 1 is an elongated member of substantially square form in section, but with the corners rounded, as shown at 2. A base plate 3 is secured on the bottom of the body; said plate having an opening 4 symmetrical to but somewhat smaller than the inside of the body 1 so as to provide an inwardly projecting flange 5 for the support of a removable closure plate 6 in the mold. The plate 6 is removably held in place by a spring catch 7 mounted on the under side thereof, which yieldably engages the under side of the flange 5 so that the closure plate 6 may be pushed toward the upper end of the mold for the expulsion of the pressed meat product 8 from said mold.

The mold body 1 is stiffened at the top by an outwardly projecting flange 9 secured to the mold body in surrounding relation. The mold body is loaded with the meat to be compressed, and the necessary compressing pressure applied, by means of a suitable mold-supporting stand and stuffing horn assembly, such as that shown in said Patent No. 2,726,024, dated December 6, 1955.

As noted in the preamble of this specification, when a solid or imperforate mold is employed for the purpose of pressing ham and other meats into loaf form, as was previously the case, it was found that the corners of the mold were filled mostly with excess fat, liquid, or the like, and air, rather than with the meat itself. As a consequence, the loaf when expelled from the mold has ragged edges—at times quite pronounced—which mar the desired neat shape and appearance of the loaf, and result in correspondingly defective appearing slices.

To avoid and eliminate the above described defect in the appearance of the loaf, a series of relatively small vent holes 10 are drilled through each corner 2 of the mold in suitably spaced relation throughout the meat-filled extent thereof. These holes are sufficiently small so that while they are effective to prevent the passage of any meat therethrough, they allow of the escape of air and any relatively light-bodied matter such as meat gelatin, pickle liquid, and the like, which would otherwise be trapped in the corners.

After the mold is stuffed and the meat compressed, of course subsequent to the removal of the mold from the stuffing horn assembly, but prior to the cooking of the pressed loaf while still in the mold, a closure and pressure plate unit, indicated generally at 11, is mounted on the outer end of the mold. This unit is of the same general character as that shown in the aforementioned patent, and comprises a closure plate 12 slidably fitting into the mold from its outer end. A stem 13 is rigidly secured to and upstands from the plate 12, and slidably but non-turnably projects into a sleeve 14. A cross head 15 is secured on the upper end of the sleeve, and a somewhat heavy compression spring 16 extends about the sleeve and stem between the cross head and plate 12. Depending from the ends of the cross head are swinging ratchet-type catch arms 17, adapted to engage the flange 9 in releasably holding relation.

A secondary closure plate 18, separate from the plate 12, is disposed under the latter and contacts both said plate 12 and the meat. The purpose of the plate 18 is to prevent any meat adhering to the plate 12 when the unit 11 is removed from the mold, and which would cause the adjacent end of the meat loaf to have an uneven surface, rather than presenting the desired flat and clean-cut appearance.

The secondary plate 18 will of course also adhere to the meat, but can be easily and cleanly sliced off therefrom once the loaf is pushed free of the mold.

After the mold, with the pressure unit 11 in place, has been subjected to the usual meat cooking period, an additional pressing action is imparted to the meat loaf as is customary before the unit 11 is removed.

Since there are no longer any air pockets, gelatin, or the like then in the corners of the mold, due to the presence of the vent holes 10 which have drained all such matter from the corner areas of the mold, the loaf as thus further compressed completely fills such corner areas and readily shapes itself to the desired contour.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. In a meat loaf pressing apparatus, a mold body of multi-sided form in section and providing corners at the junction of the sides of the body with each other, the body being closed at one end and open at the other end for the insertion into the body of a meat product to be compressed, and means including a body fitting plate to engage the product at said other end of the body and compress such product by longitudinal movement thereof into the body; the sides of the body being imperforate but there being a series of vent holes in each corner of the body of a restricted size to permit fluid matter but not meat to pass therethrough.

2. In a meat loaf pressing apparatus, a mold body of multi-sided form in section and providing relatively sharp corners at the junction of the sides of the body with each other, the body being closed at one end and open at the other end for the insertion into the body of a meat product to be compressed, and means including a body fitting plate to engage the product at said other end of the body and compress such product by longitudinal movement of said plate into the body; the body and corners being elongated in the direction of movement of the plate and relative to the cross-sectional dimensions of the mold, and there being a series of vent openings at the juncture of the sides in each corner of the body of a restricted size to permit fluid matter only to pass therethrough.

References Cited in the file of this patent

UNITED STATES PATENTS

| | | |
|---|---|---|
| 882,094 | Boyd | Mar. 17, 1908 |
| 1,267,920 | Simpson | May 28, 1918 |
| 1,436,339 | Doyle | Nov. 21, 1922 |
| 1,611,380 | Roth | Dec. 21, 1926 |
| 1,767,054 | Briggs | June 24, 1930 |
| 1,835,628 | Bellinghausen | Dec. 8, 1931 |
| 1,950,763 | Walter | Mar. 13, 1934 |
| 1,981,889 | Wolff | Nov. 27, 1934 |
| 2,244,540 | Lenzke | June 3, 1941 |